(12) United States Patent
Bartley et al.

(10) Patent No.: US 8,589,243 B2
(45) Date of Patent: Nov. 19, 2013

(54) DIGITAL LANDMARKS

(75) Inventors: William Bartley, Venice, CA (US);
Arnaud Robert, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 132 days.

(21) Appl. No.: 13/153,600

(22) Filed: Jun. 6, 2011

(65) Prior Publication Data
US 2012/0310784 A1  Dec. 6, 2012

(51) Int. Cl.
*G06Q 30/00*    (2012.01)
(52) U.S. Cl.
USPC .......................................... 705/26.1

(58) Field of Classification Search
USPC ........................................... 705/26.1
See application file for complete search history.

(56) References Cited

U.S. PATENT DOCUMENTS

2009/0064219 A1* 3/2009 Minor ............................ 725/32
2012/0158514 A1* 6/2012 Aldrey et al. .............. 705/14.66

* cited by examiner

*Primary Examiner* — Mila Airapetian
(74) *Attorney, Agent, or Firm* — Patterson & Sheridan, LLP (57) ABSTRACT

Techniques are described for notifying a user of creative digital media associated with the user's geographic location. Embodiments of the invention receive location information specifying the geographic location of the user. Embodiments identify one or more instances of creative digital media having an association with the specified geographic location of the user. An indication of at least a portion of the identified instances of creative digital media is then provided to the user.

31 Claims, 10 Drawing Sheets

DIGITAL LANDMARKS

BACKGROUND

1. Field of the Invention

Embodiments of the present invention relate to digital media, and more particularly, to providing recommendations of creative digital media to a user based on a geographical location of the user.

2. Description of the Related Art

The amount of available creative digital media is growing at an ever-increasing rate, with both new digital content being created and older content being converted into a digital format. Today, a number of devices exist for viewing and playing creative digital media. Examples of such devices include computer systems, mobile phones, specialized media players (e.g., mp3 players), tablet computers, portable gaming devices and so on. However, as the amount of creative digital media continues to grow, it becomes increasingly more difficult for users to find relevant creative digital media that the user would be interested in. Although search functionality can assist users in locating specific creative digital media, such functionality is limited to the user's ability to construct a proper search query. Furthermore, when the user is unclear about what creative digital media he is searching for, searching may require a substantial amount of time, as the user views various search results and refines the search query. Moreover, manually searching for creative digital media may not always be practical, as not all devices that are capable of playing creative digital media are suitable for performing such searches.

SUMMARY

Embodiments of the invention provide a computer-implemented method, computer-readable storage medium and system. The computer-implemented method, computer-readable storage medium and system include receiving location information specifying a geographic location of a user. The location information is determined according to a location determination algorithm. Additionally, the computer-implemented method, computer-readable storage medium and system include identifying one or more instances of creative digital media from a plurality of creative digital media that are associated with the specified geographic location. The computer-implemented method, computer-readable storage medium and system also include providing an indication of at least a portion of the identified instances of creative digital media to the user.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention provide techniques for notifying a user of creative digital media that is relevant to the user's geographical position. As used herein, "creative digital media" broadly refers to any creative media stored in a digital format. Examples of such media include, without limitation, audio content, video content, image content, and gaming content. Furthermore, instances of creative digital media are media content that is associated with one or more geographical locations. For instance, creative digital media may be associated with an event occurring at a particular location (e.g., a scene in a movie was filmed at the location), associated with an event depicted to occur at the location (e.g., the scene in the movie depicted a second, different location) or have a cultural or artistic tie to the location (e.g., a particular song is associated with a genre that is culturally tied to the location). Such an event could be specified using a time, a place, and an action having occurred at the specified place and at the specified time. As such, creative digital media as used herein is distinct from non-creative media content (digital or otherwise). Examples of non-creative media content could include purely informational content, such as digital maps, images of landmarks designed to facilitate navigation to a particular location, and information directories (e.g., phonebooks). Upon receiving location information specifying a user's current geographical location, embodiments of the invention may identify creative digital media associated with the user's location and notify the user of the identified creative digital media. The user's current geographical position may be communicated by, for instance, a global positioning system ("GPS") equipped device.

Figure 1:
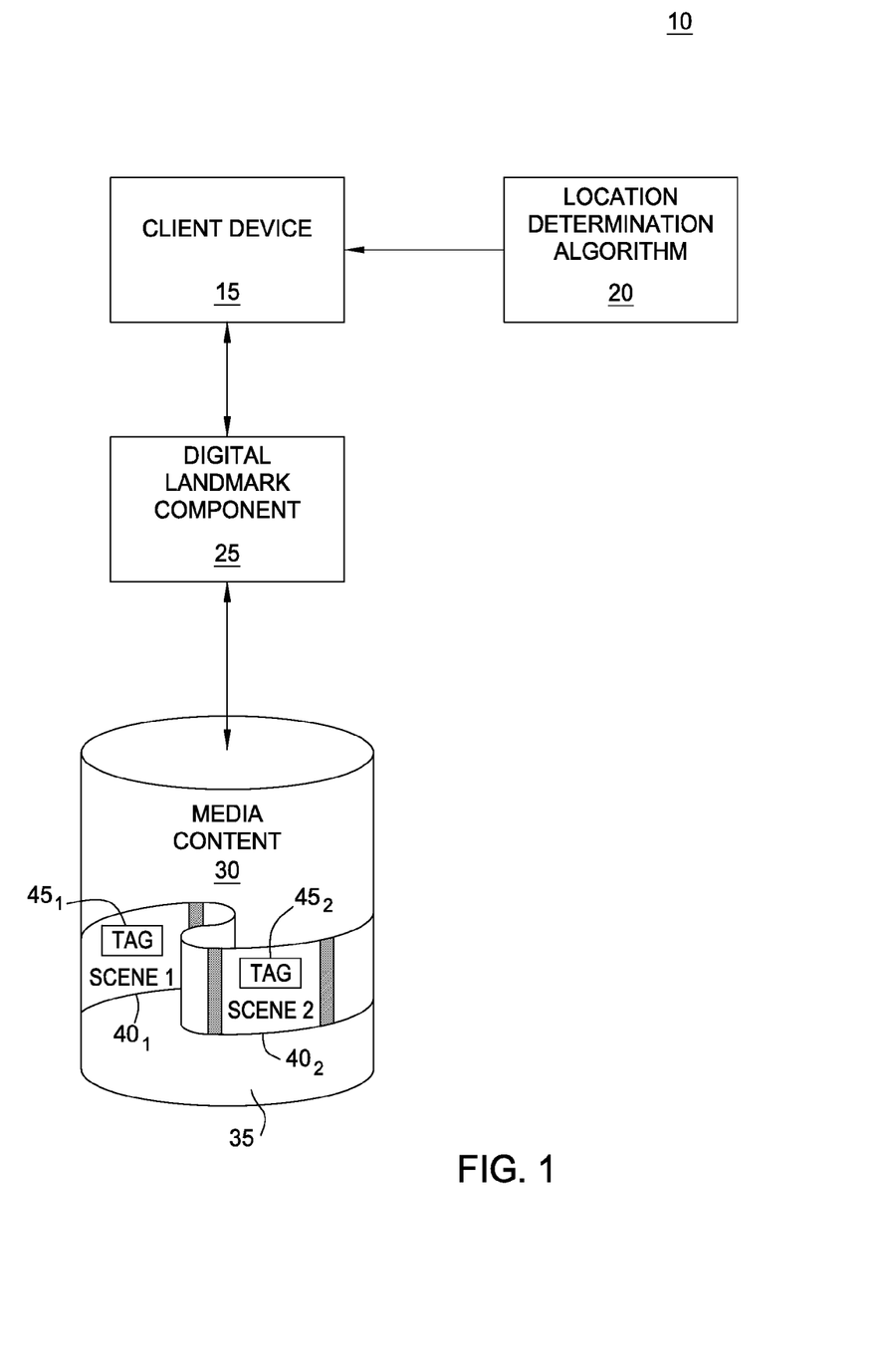
FIG. 1 is a block diagram illustrating a system configured to operate a digital landmark component, according to one embodiment of the present invention.

FIG. 1 is a block diagram illustrating a system configured to operate a digital landmark component 25. As shown, the system 10 includes a client device 15, communicatively coupled to a digital landmark component 25, which in turn is communicatively coupled to a data store of media content 30. The client device 15 generally represents any device that is configurable to perform a location determination algorithm 20. The location determination algorithm 20 generally represents any algorithm which may be used to determine a geographical location. Examples of such an algorithm 20 include, without limitation, radio transmission triangulation algorithms and network address triangulation algorithms. Such radio transmission triangulation algorithms may include GPS coordinate triangulation and Wi-Fi coordinate triangulation. For instance, according to one embodiment of the invention, the client device 15 is a mobile phone equipped with GPS functionality for performing the location determination algorithm 20. As a second example, the client device 15 may be configured to triangulate its position using Wi-Fi coordinate triangulation, based on nearby wireless access points in an extensive Wi-Fi network. The digital landmark component 25 may receive location information from the client device 15 and may identify instances of media content 30 associated with the location information. The digital landmark component 25 may then notify a user of the client device 15 about the identified media content 30.

As an example, a film 35 encoded in a digital format could have a first association with a first location where a first scene $40_1$ of the film was filmed and a second association with a second location which a second scene $40_2$ of the film depicts (i.e., that is different from the first location). In the depicted example, these associations are specified using tags 45, each of which specifying related location information for the corresponding scene 40 of the film 35. Continuing the example, if a user travels to the first location with the client device 15, the digital landmark component 25 digital landmark component 25 may determine that the user's current location matches the first location associated with the first scene $40_1$ of the film and notify the user of the film. Additionally, such a notification may specify the film's association with the user's location. As an example, the notification could prompt the user with film-related trivia, such as "Did you know that FILM_NAME was filmed here in 2001?" Advantageously, doing so provides interesting information about creative digital media to the user as the user travels to different geographical locations.

In one embodiment, the digital landmark component 25 is configured to identify a particular portion of an instance of creative digital media that is associated with the user's location. For instance, the digital landmark component 25 could identify scenes 40 of the film 35 which were filmed at the user's location and notify the user about these identified scenes 40. The digital landmark component 25 may further enable the user to view the identified scenes of the film or even the entire film itself. In one embodiment, the digital landmark component 25 is configured to search only for creative digital media which the user is already authorized to view (e.g., only films which the user already owns a digital copy of). In another embodiment, a fee (e.g., a subscription fee, a per-viewing fee, etc.) may be associated with viewing creative digital media which the user has not already purchased.

Upon identifying creative digital media related to the user's location, the digital landmark component 25 may be further configured to identify other creative digital media related to the identified creative digital media. Continuing the above example, upon determining that the film has an association with the user's current geographical location, the digital landmark component 25 may further identify digital audio content that is related to the film. For instance, the digital landmark component 25 may identify digital audio content appearing on the soundtrack of the film. The digital landmark component 25 may then notify the user of the related audio content and enable the user to listen to and/or purchase the related audio content. By doing this, embodiments advantageously promote related creative digital media in an entertaining way, which may in turn increase both sales and awareness of the related creative digital media.

While the above example involves identifying creative digital media related to a user's current geographic location, embodiments of the invention may be configured to identify creative digital media related to previous geographic locations of the user. As an example, a user could record home videos using a device (e.g., a digital camcorder) configured with a location determination algorithm (e.g., a GPS-equipped digital camcorder). Accordingly, the device could tag or otherwise associate the recorded home videos with location information specifying where the respective home video was recorded. At some later point in time (e.g., when the user is editing a recorded home video using a computer), the digital landmark component 25 could identify creative digital media associated with the previous location information associated with the home video (i.e., the location where the home video was recorded) and notify the user of the identified creative digital media.

Figure 2:
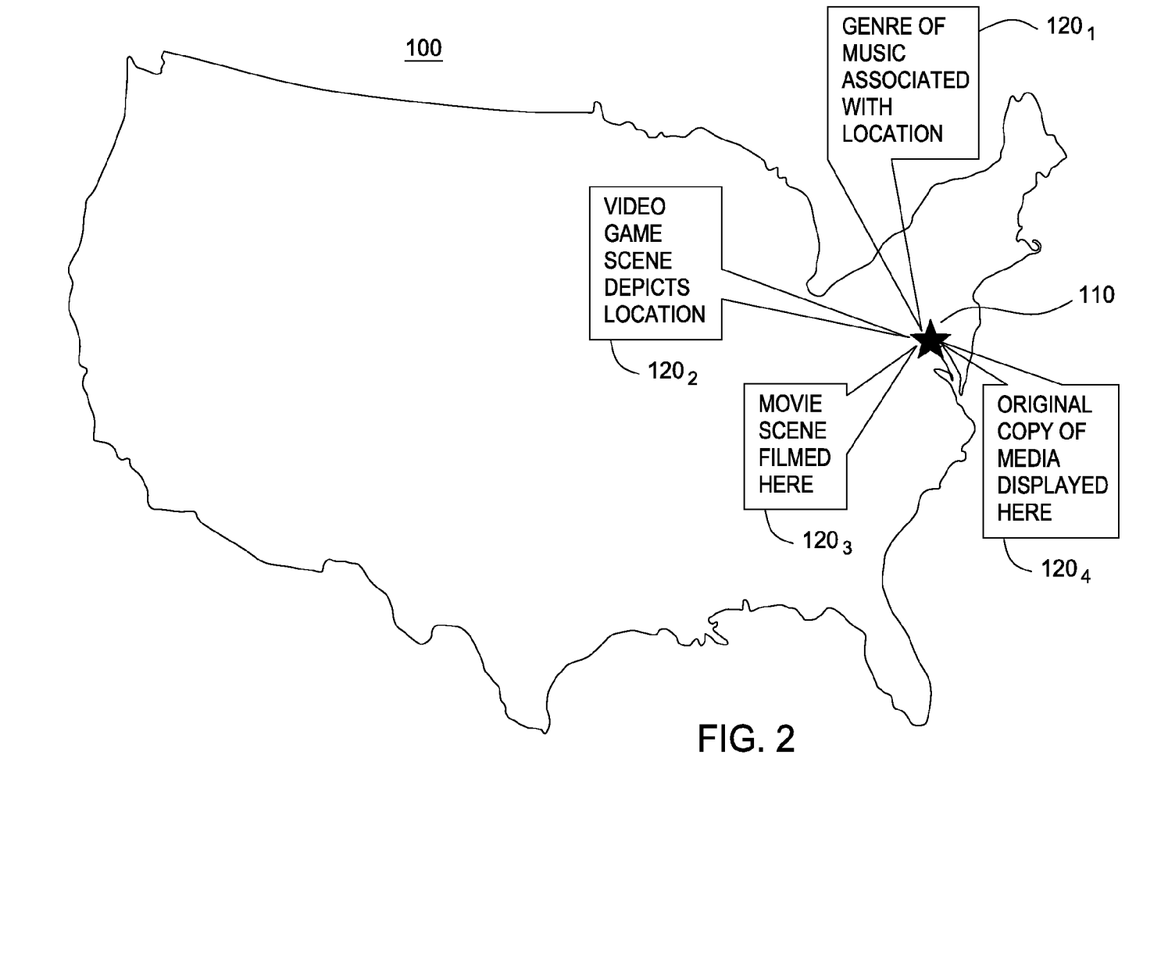
FIG. 2 is a screenshot of a digital landmark component illustrating nearby digital landmarks, according to one embodiment of the present invention.

Although the above example involves a single instance of creative digital media (i.e., a film), a geographical location may in practice be associated with a substantial number of different instances of creative digital media. For instance, FIG. 2 shows a screenshot of a digital landmark component 25 illustrating nearby digital landmarks, according to one embodiment of the present invention. As used herein, a "digital landmark" refers to an instance of creative digital media determined to have a relationship or association with a particular location. As shown, the screenshot 100 shows a location 110 and digital landmarks 120 associated with the location 110. For instance, the landmark $120_1$ indicates that a particular genre of music is associated with the location 110. In one embodiment, upon determining that the user's current location matches the location 110, the digital landmark component 25 may notify the user of music selections from the particular genre of music associated with the location 110.

As another example, the landmark $120_2$ indicates that a particular video game is associated with the location 110 because a scene of the video game depicts the location 110. As such, when the user travels to the location 110, the digital landmark component 25 may notify the user of the video game's association with the location 110. The digital landmark component 25 may further prompt the user with information on, for instance, trailers for the video game showing the depicted location 110 and purchase information for obtaining a copy of the video game. Alternatively, if the user already owns a copy of the video game, the digital landmark component 25 may prompt the user as to whether the user wishes to play the video game.

The landmark $120_3$ indicates that a particular scene of a movie was filmed at the location 110. As such, when the user travels to the location 110, the digital landmark component 25 may notify the user of the film and the scene(s) of the film relevant to the location 110. Additionally, the digital landmark component 25 may provide the user with additional details regarding the relevant scenes of the film. For instance, assume a particular scene involves a chase scene involving two cars throughout various streets in the location 110. In such a scenario, the digital landmark component 25 may prompt the user with a map detailing the streets involved in the chase scene, as well as the route the two cars followed in the scene. The user may then follow the exact route of the chase scene in person using the provided map. Advantageously, doing so provides an interesting way for the user to learn more about the film. As a result, this may positively affect the user's appreciation of the film, as well as the likelihood the user wishes to purchase the film.

As yet another example, the digital landmark $120_4$ indicates that the original copy of an instance of creative digital media is on display at the location 110. For instance, for an animated cartoon movie, an original frame used in creating the cartoon may be display in a museum at the location 110.

As such, when the user travels to the location 110, the digital landmark component 25 may notify the user of the frame that is on display and further notify the user about relevant information for viewing the exhibit. For instance, the digital landmark component 25 could provide the user with a map from the user's current location to the museum's location and information about the museum itself (e.g., admission costs, hours of operation, etc.).

Figure 3:
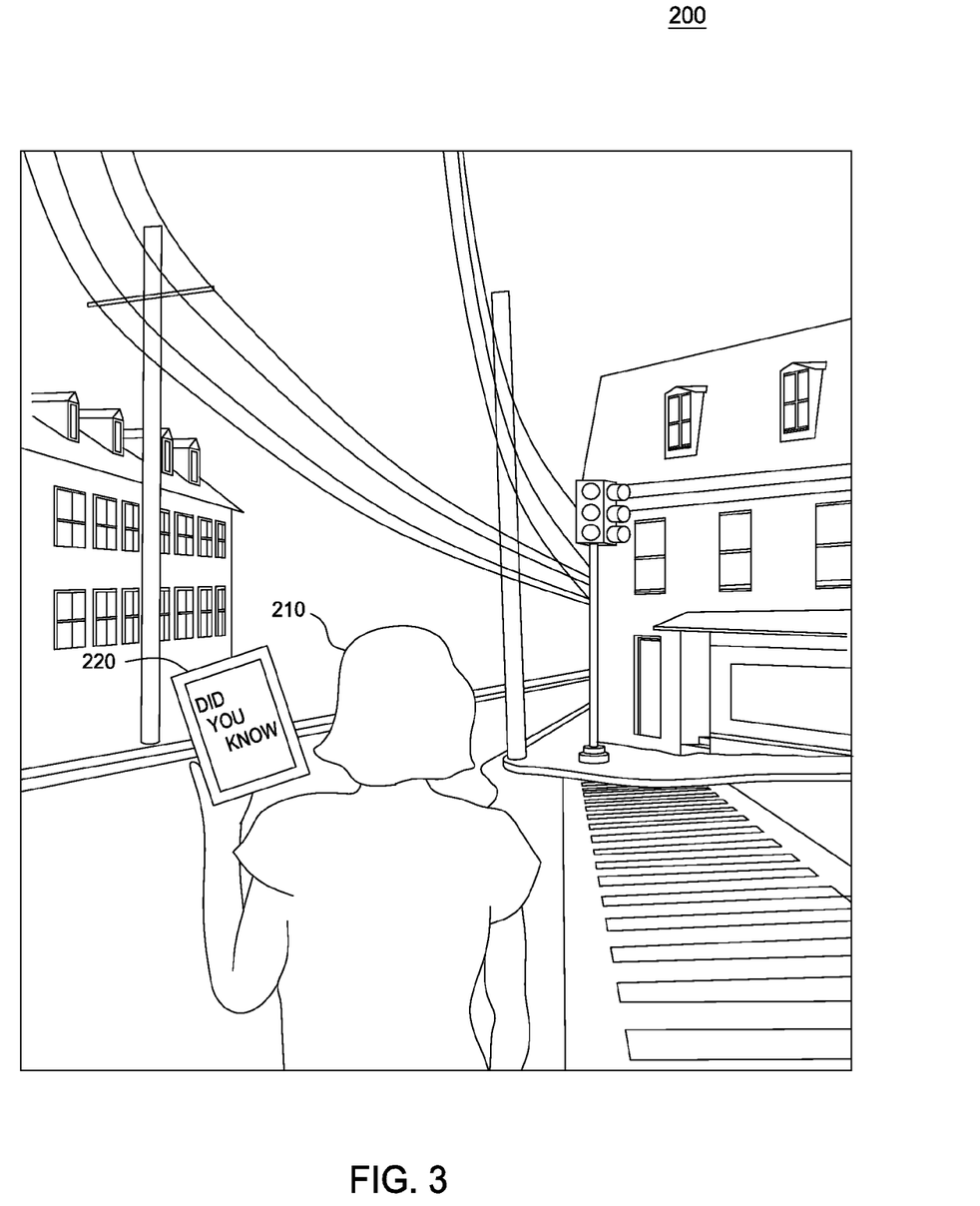
FIG. 3 illustrates a user operating a mobile device configured with a digital landmark component, according to one embodiment of the present invention.

FIG. 3 illustrates a user operating a mobile device configured with a digital landmark component 25, according to one embodiment of the present invention. As shown, the scene 200 includes a user 210 holding a mobile device 220 equipped with a digital landmark component 25. Here, as the user 210 walks along a street, the digital landmark component 25 prompts the user with information on creative digital media related to the user's current location. For instance, when the user 210 reaches an intersection where a well-known movie scene was filmed, the digital landmark component 25 could notify the user that the movie scene was filmed in the user's current location. The digital landmark component 25 may further prompt the user to view the scene of the movie, with additional movie information, with purchase information for the movie, and so on. As the user continues to walk down the street, the digital landmark component 25 may continue to identify creative digital media related to the user's location. For instance, upon reaching a second intersection, the digital landmark component 25 could determine that a particular song makes reference to the second intersection and notify the user of the song. Advantageously, by doing this, embodiments of the invention provide interesting and fun ways to inform users of creative digital media that may be of interest to the user.

Figure 4A:
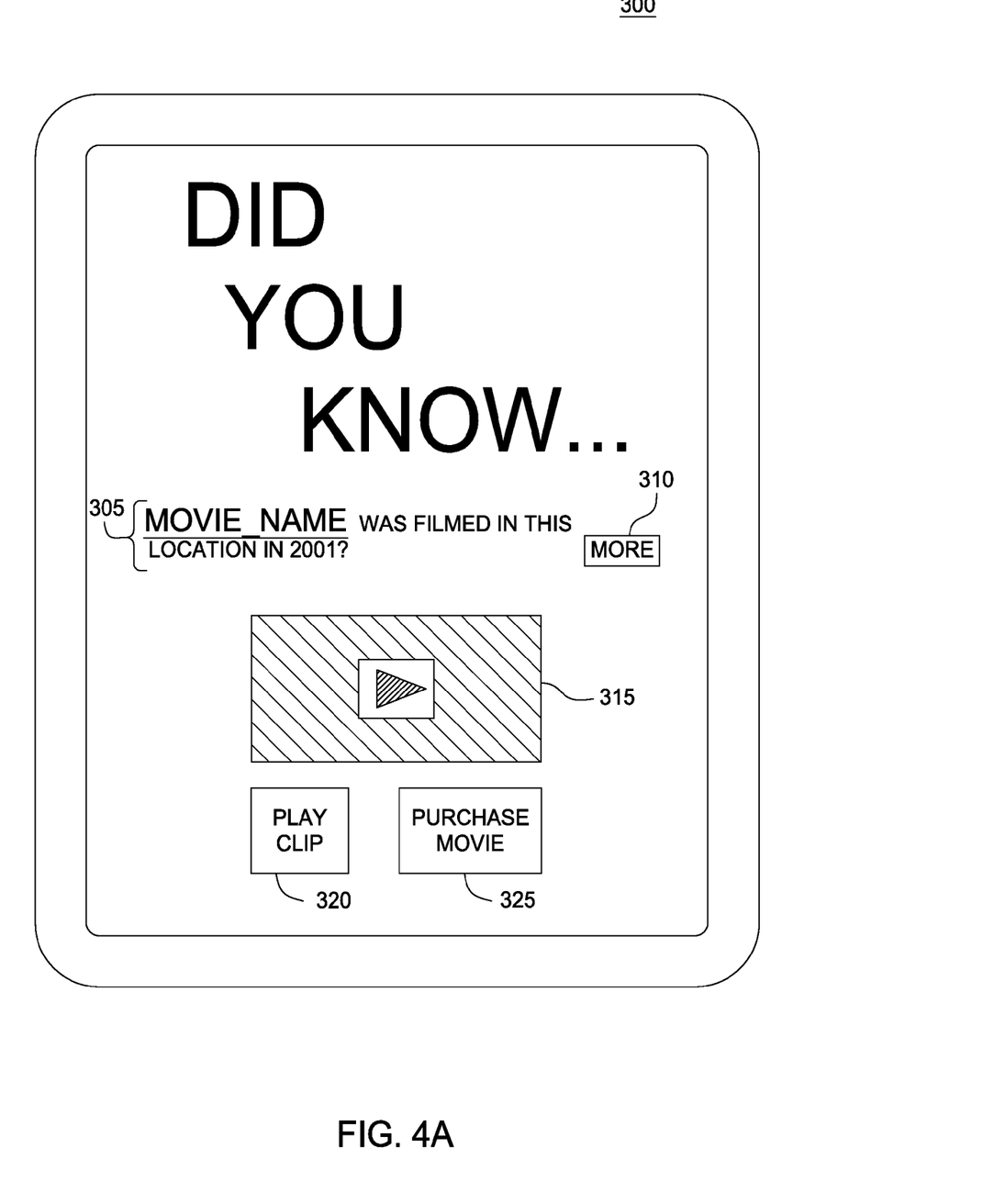
FIGS. 4A-4B are screenshots illustrating an interface for a digital landmark component, according to embodiments of the present invention.
Figure 4B:
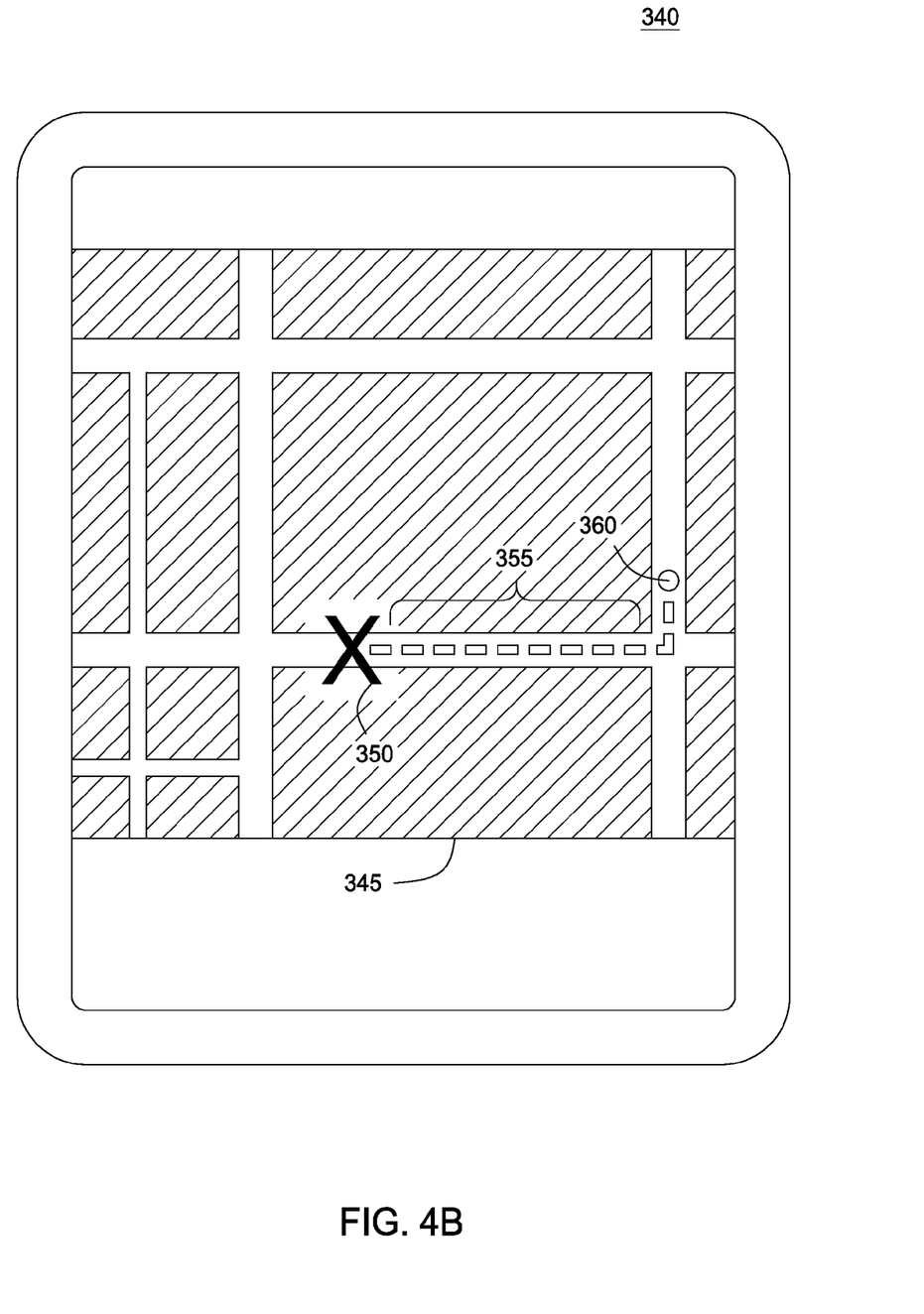

FIGS. 4A-4B are screenshots illustrating an interface for a digital landmark component 25, according to embodiments of the present invention. Initially, as discussed above, the nearby digital landmark represents an instance of creative digital media associated with a nearby geographic location. Furthermore, while a digital landmark associated with a film is used for the following examples, digital landmarks more generally may be associated with any type of creative digital media. Referring now to FIG. 4A, the screenshot 300 illustrates an interface for a digital landmark component 25 showing a nearby digital landmark, according to one embodiment of the present invention. Here, the digital landmark component 25 provides landmark information 305 to the user, which identifies the digital landmark and associated trivia about the landmark. For instance, in the present example, the digital landmark component 25 notifies the user that the nearby digital landmark (i.e., the film MOVIE_NAME) was filmed at the user's geographical location in the year 2001. Additionally, the interface provides a MORE button 310, which, when accessed, provides additional information 305 about the digital landmark to the user.

The screenshot 300 also contains a video player component 315. The video player component 315 may be configured to play a relevant portion of an identified digital landmark. For instance, the playback of the relevant portion may begin upon the user depressing the PLAY CLIP button 320. In one embodiment, the playback begins automatically upon the user coming in proximity with the location associated with the digital landmark. As an example, as the user comes into proximity with a geographical location associated with a digital landmark, the digital landmark component 25 could determine location information associated with the user's current position and identify a particular scene in the film MOVIE_NAME associated with the user's geographical location. The digital landmark component 25 could then play the identified scene of the film using the video player component 315. Advantageously, this provides and interesting and fun way to make the user aware of creative digital media as the user travels to various geographical locations.

The screenshot 300 further includes a PURCHASE MOVIE button 325 which enables the user to purchase a digital copy of the digital landmark. Once purchased, the digital copy could then be played using the video player component 315 or more generally by any media player capable of playing such creative digital media. Continuing the above example, the PURCHASE MOVIE button 325 could become available to the user after the identified scene of the digital landmark has played on the video player component 315. In this way, the user may be encouraged to purchase the film by capturing the user's interest with the scene played on the video player component 315.

As discussed above, in addition to playing the identified scene of the film, the digital landmark component 25 may also guide the user along a route and destination shown in the film. FIG. 4B is a screenshot 340 illustrating an interface for a digital landmark component 25 showing a nearby digital landmark. As shown, the screenshot shows a map 345 which is marked to show a current position of the user 360 and a path 355 to a destination 350. Here, the path 355 and destination 350 correspond to a route shown in the identified scene of the digital landmark film. For instance, assume that the digital landmark component 25 determines that a car chase scene in the film MOVIE_NAME is associated with the user's current position because the user's current position is on the route where the scene was filmed. In such an example, the digital landmark component 25 could prompt the user with the map 345, showing the user the exact route 355 the cars travelled in the film. Additionally, the map 345 could continue to update the user's position 360 as the user travels along the route 355. Advantageously, doing so provides an interactive way to display film information to the user, which may in turn increase the user's interest in the film itself.

In one embodiment, as the user travels along the route 355, the digital landmark component 25 displays a relevant portion of the scene (e.g., using the video player component 315). For instance, it is contemplated that the digital landmark component 25 divides the scene of the film into segments and as the user travels along the route 355, the digital landmark component 25 plays each of the scene segments. The digital landmark component 25 may divide the scene into predetermined number of segments (e.g., 4 segments). Here, as the user traverses a portion of the route (e.g., 25%), the digital landmark component 25 may play a corresponding segment of the scene. In one embodiment, the digital landmark component 25 divides the scene into segments of a predetermined length (e.g., 6 seconds each). In such an embodiment, the digital landmark component 25 could also determine a total distance travelled in the chase scene, as well as a distance travelled during each segment. Continuing the example, as the user traverses the determined distance, the digital landmark component 25 could play the corresponding segment of the scene. Doing so provides an interesting and interactive technique for displaying the scene of the film to the user.

In another embodiment, the digital landmark component 25 may generate a map directing the user from the user's current location to the location associated with particular creative digital media. For example, the digital landmark component 25 could determine that scenes of a particular film were shot at a first location that is 3 blocks away from the user's present location. In such an example, the digital landmark component 25 could determine a route from the user's present location to the determined first location and could display a map of the determined route to the user. Once the user reaches the first location, the digital landmark component 25 could display a second map to the user of a route travelled in the scene of the film, as described above.

Figure 5:
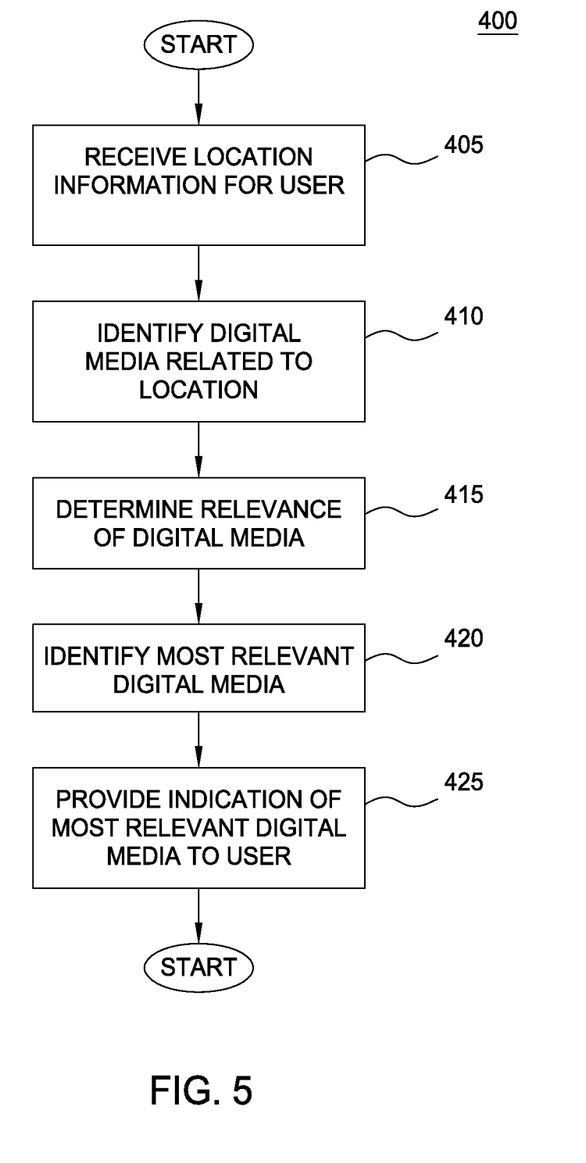
FIG. 5 is a flow diagram illustrating a method for identifying digital landmarks, according to one embodiment of the present invention.

FIG. 5 is a flow diagram illustrating a method for identifying digital landmarks, according to one embodiment of the present invention. As shown, the method 400 begins at step 405, where the digital landmark component 25 receives location information for a user. As discussed above, the location information may be determined by a GPS device associated with the user (e.g., the user's GPS-equipped mobile phone). In one embodiment, the location information may be determined using network address triangulation. For instance, the digital landmark component 25 may identify an internet protocol ("IP") address associated with the user (e.g., the IP address of the user's computer) and triangulate the user's geographic location based on the identified IP address. More generally, however, any technique for determining the user's current geographical location may be used with embodiments of the present invention.

Once the location information is received, the digital landmark component 25 identifies instances of creative digital media that are related to the received location (step 410). The digital landmark component 25 may be configured to identify only digital landmarks having an association with the user's exact geographical location. In one embodiment, the digital landmark component 25 is configured to identify all digital landmarks having an association within a predetermined distance from the user's geographical location. For example, the digital landmark component 25 could be configured to identify all digital landmarks having an association with a location within 10 miles of the user's geographical location. In another embodiment, the digital landmark component 25 is configured to identify all digital landmarks within the user's current geographic region. For instance, upon determining that the user is currently located in San Francisco, the digital landmark component 25 could identify all digital landmarks having an association with the city San Francisco. In one embodiment, the digital landmark component 25 is configured to identify only creative digital media which the user is authorized to access. This may include, for instance, creative digital media which the user has already purchased a copy of, as well as creative digital media accessible by the user as part of a subscription plan for the user.

Once the related instances of digital are identified, the digital landmark component 25 then determines a relevance of each instance of creative digital media for the user (step 415). The digital landmark component 25 may determine the relevancy value based on, for instance, historical data for the user indicating the personal preferences of the user. For instance, the historical data may indicate that a particular user may have previously accessed a substantial number of music files and music-related content (e.g., music-related web pages), but the user has not shown any previous interest in video games. Based on this, the digital landmark component 25 may determine that digital landmarks near the location relating to audio content are more relevant to the particular user, while nearby digital landmarks relating to video games are less relevant. Additionally, the relevancy value may be determined based on the proximity of the location the creative digital media is associated with to the user's present location. In such an embodiment, the digital landmark component 25 could determine that creative digital media associated with a location 1 mile from the user's present location is more relevant than second creative digital media associated with a second location 20 miles from the user's present location.

In particular embodiments, the relevancy value is determined based at least in part on temporal information for the creative digital media. That is, for creative digital media having some association with an event either occurring at a particular location or depicted to occur at the particular location, the digital landmark component 25 may consider when the event occurred in determining the relevancy of the creative digital media. For instance, a user could specify (e.g., in a user profile or explicitly in a request to identify relevant creative digital media) a range of time that the user is particularly interested in. As an example, the user could specify that movies associated with the 1990s are of particular interest. As such, the digital landmark component 25 could consider creative digital media associated with events occurring during the 1990s (or depicted to occur during the 1990s) as particularly relevant to the user.

In one embodiment, the digital landmark component 25 is configured to determine time periods that the user is interested in based on historical data characterizing previous actions of the user. For instance, the digital landmark component 25 could monitor the user's interactions with creative digital media and determine that the user frequently interacts with content from a particular time period (e.g., the 1990s). As such, when determining the relevancy of creative digital media for the user, the digital landmark component 25 could consider content from the particular time period to be more relevant to the user, based on the user's previous interactions.

In one embodiment, the user may explicitly specify parameters for use in determining the relevance of identified digital landmarks. For instance, the user could maintain a user profile with the digital landmark component 25 which stores user preferences for the user. As an example, the user could specify in the user profile which types of creative digital media the digital landmark component 25 should (or should not) identify digital landmarks for. In one embodiment, the user may specify parameters for use in the context of a single request to identify nearby digital landmarks. For instance, the user could request (e.g., using an interface of the digital landmark component 25) that the digital landmark component 25 identify digital landmarks in proximity to the user's current geographical location relating only to audio creative digital media. The digital landmark component 25 could then determine that nearby digital landmarks relating to other types of creative digital media (e.g., video content or video game content) are less relevant to the user's request for audio creative digital media associated with the user's location.

Once the relevance of each nearby digital landmark is determined, the digital landmark component 25 selects the most relevant digital landmarks (step 420). For instance, the digital landmark component 25 may select a predetermined number of the digital landmarks having the highest relevance values. In one embodiment, the digital landmark component 25 selects all the digital landmarks having a relevance value above a threshold level of relevance. Once the most relevant nearby digital landmarks are selected, the digital landmark component 25 provides an indication of the most relevant digital landmarks to the user (step 425), and the method 400 ends. Advantageously, doing so informs the user of the most relevant nearby digital landmarks, while avoiding overwhelming the user with information.

Figure 6:
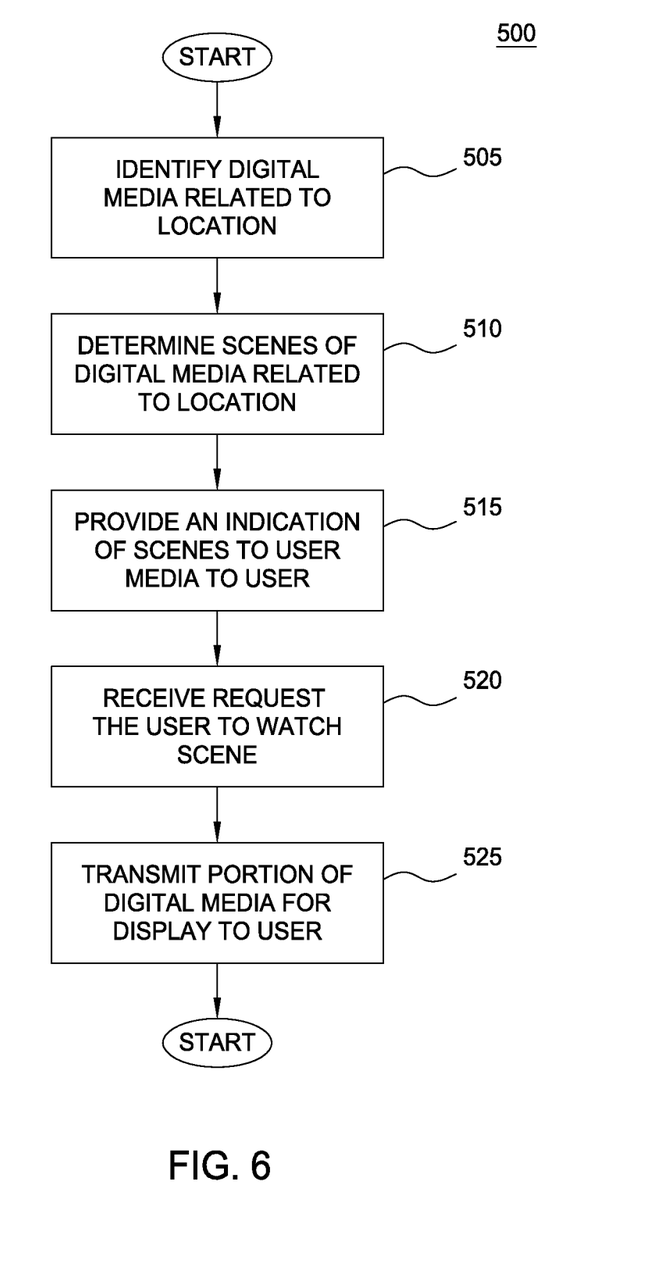
FIG. 6 is a flow diagram illustrating a method for identifying digital landmarks, according to one embodiment of the present invention.

FIG. 6 is a flow diagram illustrating a method for identifying digital landmarks, according to one embodiment of the present invention. As shown, the method 500 begins at step 505, where a digital landmark component 25 identifies creative digital media related to a received location. The digital landmark component 25 then determines one or more scenes of the identified creative digital media that are related to the location (step 510). For instance, the digital landmark component 25 could access a database that stores data relating instances of creative digital media to various geographic locations. As discussed above, such relationships may be based on a wide variety of factors, examples of which include, without limitation, where a scene of the content was filmed or recorded, a location the scene depicts, a location associated with the genre or the creative digital media, a location referenced (e.g., by name) in the scene, and so on.

Once the scenes are identified, the digital landmark component 25 provides at least an indication of the scenes to the user (step 515). As discussed above, the digital landmark component 25 may also provide other information relating to the identified creative digital media to the user. For instance, the digital landmark component 25 could provide trivia information relating to the scene. In one embodiment, the digital landmark component 25 may play the scene to the user (e.g., using the video player component 315). At step 520, the digital landmark component 25 receives a request from the user to watch one of the scenes presented to the user. In response to the request, the digital landmark component 25 transmits a corresponding portion of the creative digital media to the user for display (step 525), and the method 500 ends.

Figure 7:
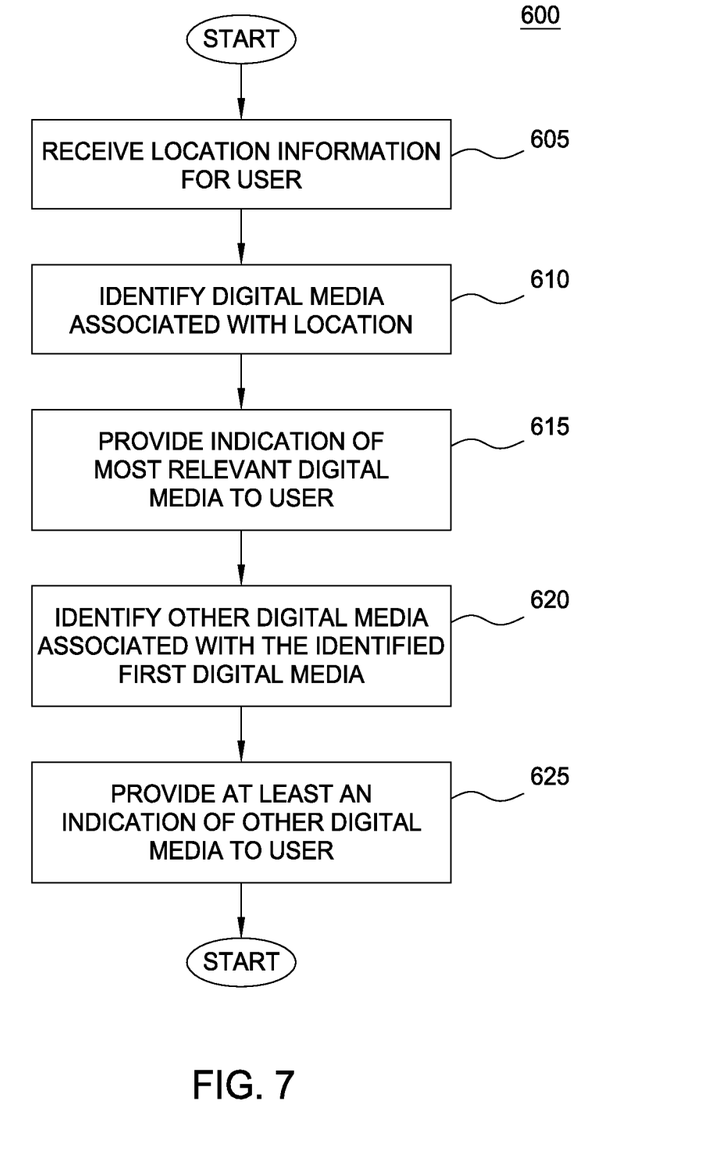
FIG. 7 is a flow diagram illustrating a method for identifying digital content related to digital landmarks, according to one embodiment of the present invention.

FIG. 7 is a flow diagram illustrating a method for identifying digital content related to digital landmarks, according to one embodiment of the present invention. As shown, the method 600 begins at step 605, where the digital landmark component 25 receives location information specifying a current geographical location of a user. As discussed above, such location information may be obtained using any technique for obtaining location information (e.g., using GPS coordinates or network address triangulation). Upon receiving the location information specifying the geographical location for the user, the digital landmark component 25 identifies digital media associated with the location (step 610). The digital landmark component 25 then provides an indication of the most relevant identified digital media to the user (step 615). For instance, the digital landmark component 25 could use the method 500 (discussed above) to identify the most relevant digital media for the user. For purposes of this example, assume that the digital media determined to be most relevant to the user includes a first instance of creative digital media.

The digital landmark component 25 then identifies other instances of creative digital media associated with the first instance of creative digital media (step 615). Generally, the digital landmark component 25 may determine such an association exists based on a wide variety of factors relating the two instances of creative digital media. For instance, the digital landmark component 25 could determine that a second instance of creative digital media is related to the first instance based on common artists between the two instances of content. As another example, the digital landmark component 25 could determine two instances of creative digital media are related based on the second instance being a sequel (or prequel) to the first instance. As yet another example, the digital landmark component 25 could determine two instances are related based on the genre of the instances (e.g., both instances are audio content belonging to the "Alternative Rock" genre). Once the associated creative digital media is identified, the digital landmark component 25 provides an indication of the identified other creative digital media to the user (step 625), and the method 600 ends.

Figure 8:
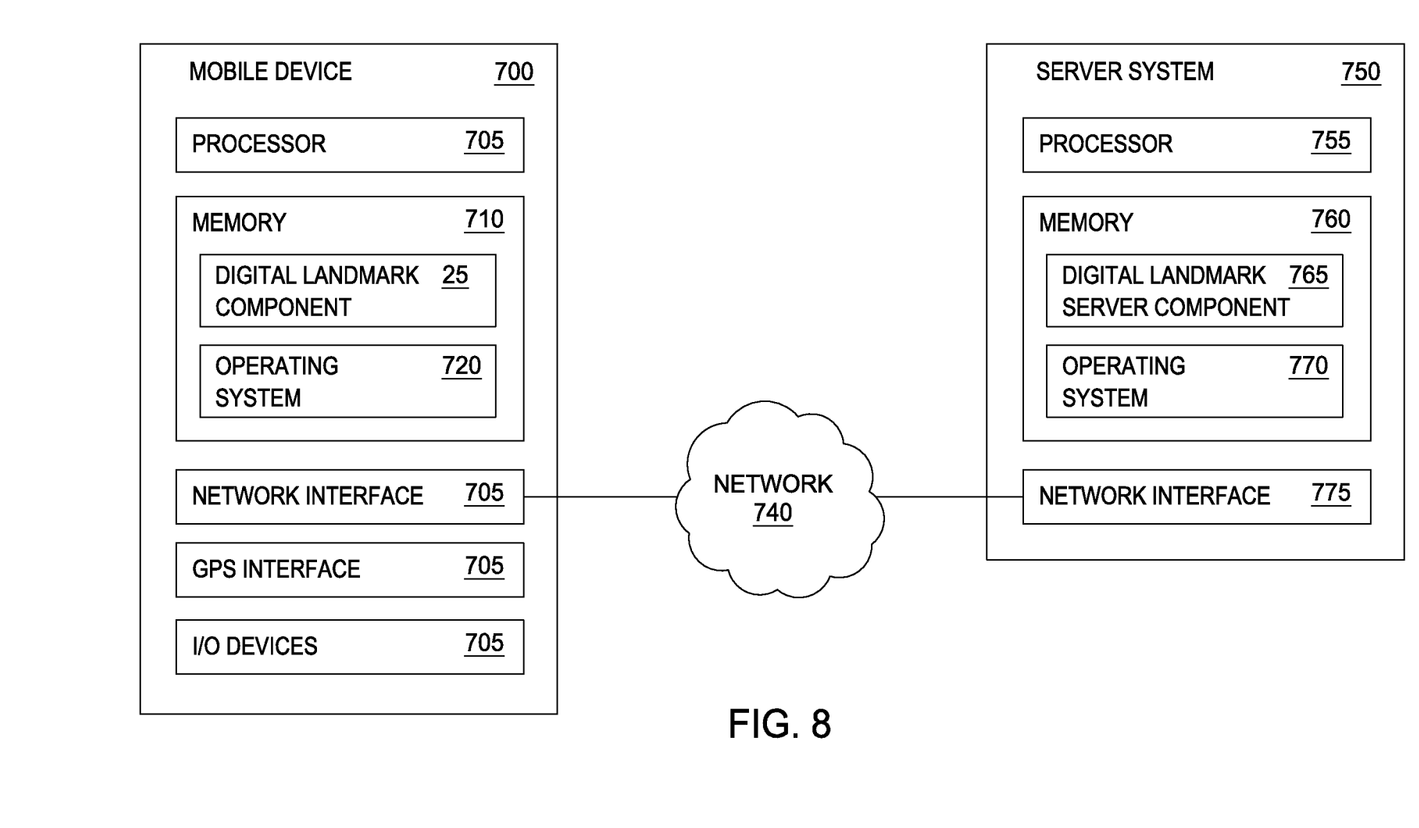
FIG. 8 is a block diagram illustrating a system configured to operate a digital landmark component, according to one embodiment of the present invention.

FIG. 8 is a block diagram illustrating a system configured to operate a digital landmark component 25, according to one embodiment of the present invention. In this example, the system 780 includes a mobile device 700 and a server system 750, communicatively coupled via a network 740. As shown, the mobile device 700 includes, without limitation, a processor 705, memory 710, a network interface 725, a global positioning system ("GPS") interface 730 and I/O devices 735. Generally, the processor 705 retrieves and executes programming instructions stored in the memory 710. Processor 705 is included to be representative of a single CPU, multiple CPUs, a single CPU having multiple processing cores, GPUs having multiple execution paths, and the like. The memory 710 is generally included to be representative of a random access memory. The GPS interface 730 may generally receive signals transmitted by a GPS satellite, which may then be processed (e.g., using trilateration) to determine a current geographic position of the mobile device 700. The network interface 725 enables the mobile device 700 to connect to the data communications network 740 (e.g., wired Ethernet connection or an 802.11 wireless network). Further, while the depicted embodiment illustrates the components of a particular mobile device 700, one of ordinary skill in the art will recognize that mobile computing devices may use a variety of different hardware architectures. Moreover, it is explicitly contemplated that embodiments of the invention may be implemented using any device or computer system capable of performing the functions described herein.

Illustratively, the memory 710 includes a digital landmark component 25 and an operating system 720. The operating system 720 generally controls the execution of application programs on the mobile device 700. The digital landmark component 25 may generally identify creative digital media related to a current geographic position of the mobile device 700 and provide an indication of the identified creative digital media to the user. For instance, the digital landmark component 25 may use the GPS interface 730 to determine the current geographic position of the mobile device 700. The digital landmark component 25 could then transmit this location information to a digital landmark server component 765. The digital landmark server component 765 could identify creative digital media related to the geographic position and return this information to the digital landmark component 25. The digital landmark component 25 could then display this information to the user (e.g., using an I/O device 735 such as a display).

The server system 750 contains a processor 755, memory 760 and a network interface 775. Generally, the processor 755 retrieves and executes programming instructions stored in the memory 760. Processor 755 is included to be representative of a single CPU, multiple CPUs, a single CPU having multiple processing cores, GPUs having multiple execution paths, and the like. The memory 760 is generally included to be representative of a random access memory. The network interface 775 enables the server system 750 to connect to the data communications network 740 (e.g., wired Ethernet connection or an 802.11 wireless network).

As shown, memory 760 contains a digital landmark server component 765 and an operating system 770. The operating system 770 generally controls the execution of application programs on the server system 750. The digital landmark server component 765 may be configured to receive location information from a requesting entity (e.g., the mobile device 700), identify creative digital media associated with the received location, and transmit an indication of the identified creative digital media to the requesting entity. For example, upon receiving the location information, the digital landmark server component 765 may access a database containing a listing of creative digital media and associated locations. The digital landmark server component 765 may then query the database to identify creative digital media associated with the received location, and return the results of the query to the requesting entity.

Although the depicted embodiment uses a client/server model, it is explicitly contemplated that embodiments of the invention may be implemented using a single application. In such an embodiment, the digital landmark component 25 could determine the location of the mobile device 700, identify creative digital media associated with the determined location (e.g., from creative digital media currently stored on the device), and present the identified creative digital media to the user. Such a configuration may be preferable, for instance, when the mobile device would be unable to connect to the digital landmark server component 765 (e.g., when no network connection is available for the mobile device 700).

The I/O devices 735 represent a wide variety of input and output devices, including displays, keyboards, touch screens, and so on. For instance, the I/O devices 735 may include a display device used to provide a user interface. As an example, the display may provide a touch sensitive surface allowing the user to select different applications and options within an application (e.g., to select an instance of creative digital media to view). Additionally, the I/O devices 735 may include a set of buttons, switches or other physical device mechanisms for controlling the mobile device 700. For example, the I/O devices 735 could include a set of directional buttons used to navigate a menu presented on the display. In such a case, the menu could allow users to select an application program. Additionally, the user interface could allow users to select, purchase or otherwise obtain creative digital media presented to the user based on the user's current location. For example, the digital landmark component 25 could indicate to the user that a particular movie was filmed at the user's current location and enable the user to download relevant scenes from the movie that are related to the user's location.

Figure 9:
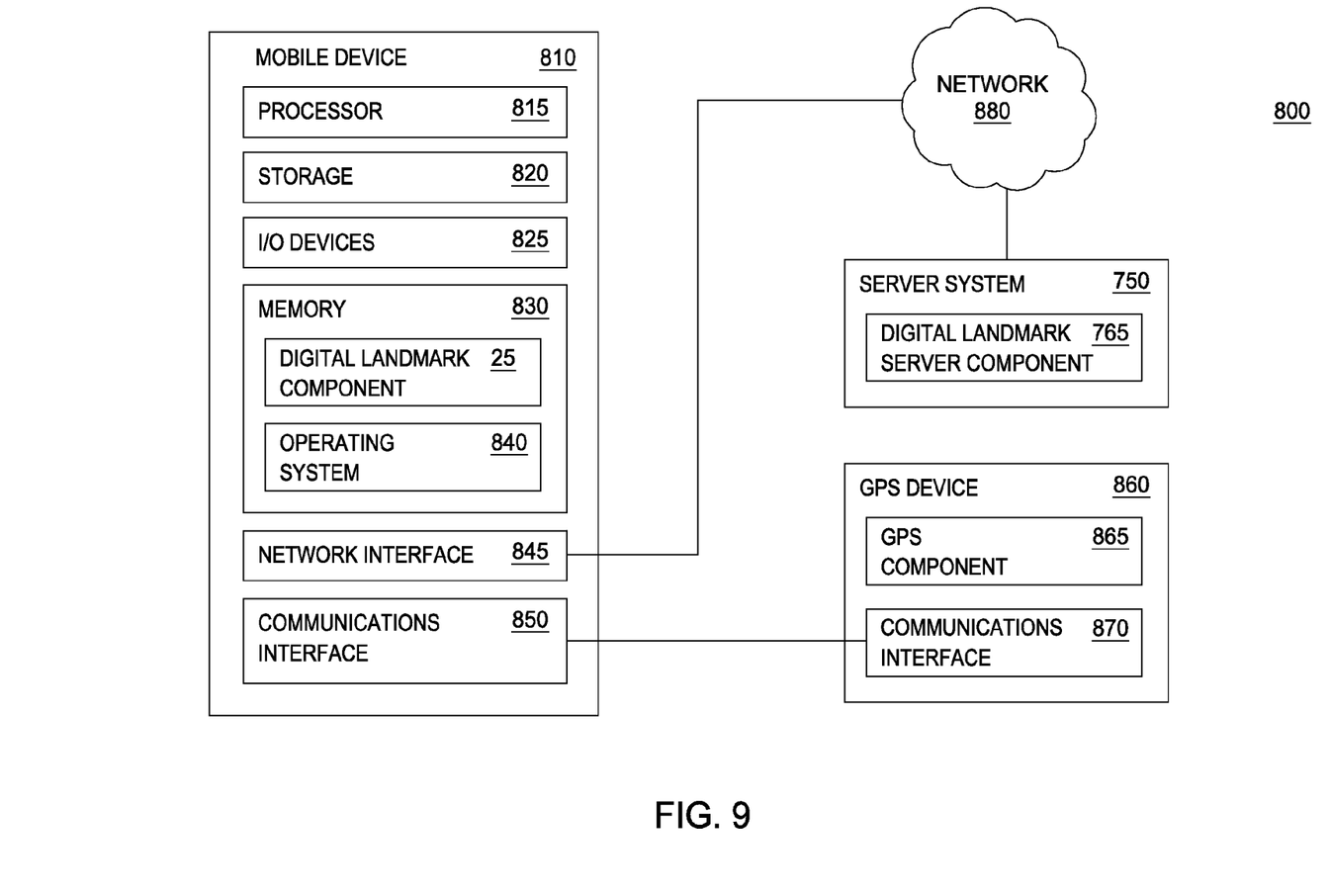
FIG. 9 is a block diagram illustrating a system configured to operate a digital landmark component, according to one embodiment of the present invention.

FIG. 9 is a block diagram illustrating a system configured to operate a digital landmark component 25, according to one embodiment of the present invention. As shown, the client device 810 includes a processor 815, which obtains instructions and data via a bus from memory 830 and storage 820. Processing unit 815 is a programmable logic device that performs instruction, logic, and mathematical processing, and may be representative of one or more CPUs and/or GPUs. Storage 820 stores application programs and data for use by the client device 810. The storage 820 represents hard-disk drives, flash memory devices, optical media and the like. The client device 810 is operably connected to the network 880 via the network interface 845.

The memory 830 represents any memory sufficiently large to hold the necessary programs and data structures. Memory 830 could be one or a combination of memory devices, including Random Access Memory, nonvolatile or backup memory (e.g., programmable or Flash memories, read-only memories, etc.). In addition, memory 830 and storage 820 may be considered to include memory physically located elsewhere; for example, on another computer communicatively coupled to the client device 810.

The client device 810 also contains a communications interface 850, which enables the client device 810 to communicate with the GPS device 860 (via communications interface 870). The communications interface 850 represents any interface through which GPS-related data may be communicated. Examples of the communications interface 850 include, without limitation, universal serial bus ("USB"), Bluetooth®, and so on. Generally, the GPS device 860 represents any device capable of receiving and processing GPS satellite signals. The GPS device 860 contains a GPS component 865 and the communications interface 870. The GPS component 865 may receive and process GPS satellite signals to determine a geographic location of the GPS device 860. Examples of such a device 860 include mobile phones with GPS capabilities, portable GPS devices (e.g., TomTom® GPS system), and specialized GPS devices designed to add GPS functionality to an existing device (e.g., a dongle and associated applications that enable GPS capabilities).

The system 800 also includes the server system 750. The server system 750 contains the digital landmark server component 765. As shown, the server system 750 is operably connected to the network 880. As discussed above, the digital landmark server component 765 may be configured to receive location information from a requestor (e.g., from the client device 810), identify instances of creative digital media associated with the received location, and return the identified instances of creative digital media to the requestor.

As shown, memory 240 includes an operating system (OS) 840 and a digital landmark component 25. Operating system 840 is the software used for managing the operation of the computer system 810. Examples of operating system 840 include UNIX, a version of the Microsoft Windows® operating system, and distributions of the Linux® operating system. (Note: Linux is a trademark of Linus Torvalds in the United States and other countries.) Additional examples of operating system 840 include custom operating systems for gaming consoles, including the custom operating systems for systems such as the Nintendo DS® and Sony PSP®.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the preceding aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., a digital landmark server component 765) or related data available in the cloud. For example, the digital landmark server component 765 could execute on a computing system in the cloud and receive location information for a user (e.g., from a digital landmark component 25 operating on a mobile device or a computer system). In such a case, the digital landmark server component 765 could determine creative digital media associated with the received location for the user by accessing data repositories containing creative digital media and/or metadata related to the creative digital media at a storage location in the cloud. The digital landmark server component 765 could then provide an indication to the user of the determined creative digital media associated with user's location. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method, comprising:
   receiving location information specifying a geographic location of a user, wherein the location information is determined according to a location determination algorithm;
   identifying, by operation of one or more computer processors, one or more instances of creative digital media, from a plurality of creative digital media, that include content with a predefined association with the specified geographic location; and
   providing an indication of at least a portion of the identified instances of creative digital media to the user.

2. The computer-implemented method of claim 1, further comprising:
   determining a relevancy value for each of the identified instances of creative digital media;
   selecting a predetermined number of the identified instances of creative digital media having the highest relevancy values; and
   providing an indication of the selected instances of creative digital media having the highest relevancy values to the user.

3. The computer-implemented method of claim 1, wherein each instance of creative digital media in the plurality of creative digital media is associated with media location information specifying one or more locations the respective instance of creative digital media is associated with.

4. The computer-implemented method of claim 3, wherein identifying one or more instances of creative digital media that have a predefined association with the specified geographic location further comprises:
   comparing the received location information with the media location information associated with each instance of creative digital media to determine similarities there between, wherein the one or more instances of creative digital media associated with the specified geographic location are identified based on the determined similarities.

5. The computer-implemented method of claim 3, wherein the media location information for a first instance of creative digital media further specifies route data for a first portion of the creative digital media that is associated with the geographic location of the user, wherein the route data describes a geographic route travelled during the first portion of the creative digital media, and further comprising:
   transmitting the route data for display to the user.

6. The computer-implemented method of claim 1, wherein identifying one or more instances of creative digital media that have a predefined association with the specified geographic location further comprises:
   identifying all creative digital media associated with locations within a predetermined distance of the geographic location of the user.

7. The computer-implemented method of claim 1, further comprising:
   receiving a request to retrieve at least a portion of an identified instance of creative digital media for the user; and
   transmitting the at least a portion of creative digital media to the user for output.

8. The computer-implemented method of claim 1, wherein the location determination algorithm uses at least one of radio transmission triangulation and network address triangulation to calculate the geographic location of the user.

9. The computer-implemented method of claim 1, further comprising:
   determining whether the user has access rights to each of the identified one or more instances of creative digital media; and
   upon determining the user does not have access rights to a first instance of creative digital media, prompting the user with purchase information for the first instance of creative digital media.

10. A computer-readable storage medium containing a program that, when executed, performs an operation comprising:
    receiving location information specifying a geographic location of a user, wherein the location information is determined according to a location determination algorithm;
    identifying one or more instances of creative digital media, from a plurality of creative digital media, that include content with a predefined association with the specified geographic location; and
    providing an indication of at least a portion of the identified instances of creative digital media to the user.

11. The computer-readable storage medium of claim 10, the operation further comprising:
    determining a relevancy value for each of the identified instances of creative digital media;
    selecting a predetermined number of the identified instances of creative digital media having the highest relevancy values; and
    providing an indication of the selected instances of creative digital media having the highest relevancy values to the user.

12. The computer-readable storage medium of claim 10, wherein each instance of creative digital media in the plurality of creative digital media is associated with media location information specifying one or more locations the respective instance of creative digital media is associated with.

13. The computer-readable storage medium of claim 12, wherein identifying one or more instances of creative digital media that are associated with the specified geographic location further comprises:
    comparing the received location information with the media location information associated with each instance of creative digital media to determine similarities there between, wherein the one or more instances of creative digital media associated with the specified geographic location are identified based on the determined similarities.

14. The computer-readable storage medium of claim 12, wherein the media location information for a first instance of creative digital media further specifies route data for a first portion of the creative digital media that is associated with the geographic location of the user, wherein the route data describes a geographic route travelled during the first portion of the creative digital media, and further comprising:
    transmitting the route data for display to the user.

15. The computer-readable storage medium of claim 10, wherein identifying one or more instances of creative digital media that have a predefined association with the specified geographic location further comprises:
    identifying all creative digital media associated with locations within a predetermined distance of the geographic location of the user.

16. The computer-readable storage medium of claim 10, the operation further comprising:
   receiving a request to retrieve at least a portion of an identified instance of creative digital media for the user; and
   transmitting the at least a portion of creative digital media to the user for output.

17. The computer-readable storage medium of claim 10, wherein the location determination algorithm uses at least one of radio transmission triangulation and network address triangulation to calculate the geographic location of the user.

18. The computer-readable storage medium of claim 10, the operation further comprising:
   determining whether the user has access rights to each of the identified one or more instances of creative digital media; and
   upon determining the user does not have access rights to a first instance of creative digital media, prompting the user with purchase information for the first instance of creative digital media.

19. A system, comprising:
   a processor; and
   a memory containing a program that, when executed by the processor, performs an operation comprising:
      receiving location information specifying a geographic location of a user, wherein the location information is determined according to a location determination algorithm;
      identifying one or more instances of creative digital media, from a plurality of creative digital media, that include content with a predefined association with the specified geographic location; and
      providing an indication of at least a portion of the identified instances of creative digital media to the user.

20. The system of claim 19, the operation further comprising:
   determining a relevancy value for each of the identified instances of creative digital media;
   selecting a predetermined number of the identified instances of creative digital media having the highest relevancy values; and
   providing an indication of the selected instances of creative digital media having the highest relevancy values to the user.

21. The system of claim 19, wherein each instance of creative digital media in the plurality of creative digital media is associated with media location information specifying one or more locations the respective instance of creative digital media is associated with.

22. The system of claim 21, wherein identifying one or more instances of creative digital media that have a predefined association with the specified geographic location further comprises:
   comparing the received location information with the media location information associated with each instance of creative digital media to determine similarities there between, wherein the one or more instances of creative digital media associated with the specified geographic location are identified based on the determined similarities.

23. The system of claim 21, wherein the media location information for a first instance of creative digital media further specifies route data for a first portion of the creative digital media that is associated with the geographic location of the user, wherein the route data describes a geographic route travelled during the first portion of the creative digital media, and further comprising:
   transmitting the route data for display to the user.

24. The system of claim 19, wherein identifying one or more instances of creative digital media that have a predefined association with the specified geographic location further comprises:
   identifying all creative digital media associated with locations within a predetermined distance of the geographic location of the user.

25. The system of claim 19, the operation further comprising:
   receiving a request to retrieve at least a portion of an identified instance of creative digital media for the user; and
   transmitting the at least a portion of creative digital media to the user for output.

26. The system of claim 19, wherein the location determination algorithm uses at least one of radio transmission triangulation and network address triangulation to calculate the geographic location of the user.

27. The system of claim 19, the operation further comprising:
   determining whether the user has access rights to each of the identified one or more instances of creative digital media; and
   upon determining the user does not have access rights to a first instance of creative digital media, prompting the user with purchase information for the first instance of creative digital media.

28. A computer-implemented method, comprising:
   receiving location information specifying a geographic location of a user, wherein the location information is determined according to a location determination algorithm;
   identifying a portion of an instance of creative digital media that includes content with a predefined association with the specified geographic location;
   providing an indication of the association between the portion of creative digital media and the specified geographic location to the user; and
   transmitting the identified portion of creative digital media to the user.

29. A computer-implemented method, comprising:
   in response to a user action, generating a graphical map specifying a visual representation of a geographic location based on the user action;
   identifying, by operation of one or more computer processors, one or more instances of creative digital media from a plurality of creative digital media, that include content with a predefined association with the geographic location; and
   outputting for display an indication of each of the identified one or more instances of creative digital media.

30. The method of claim 29, further comprising:
   receiving, from a client entity, a selection of a first one of the one or more instances of creative digital media; and
   responsive to the received selection, causing at least a portion of the selected instance of creative digital media to be transmitted to the client entity.

31. The method of claim 29, wherein outputting further comprises:
   providing a visual interface that includes one or more selectable elements, wherein each of the one or more selectable elements corresponds to a respective one of the one or more instances of creative digital media, and wherein each selectable element, when selected, causes at least a portion of the corresponding instance of creative digital media to be transmitted to a client entity.

* * * * *